(12) United States Patent
Fullerton et al.

(10) Patent No.: US 7,451,512 B2
(45) Date of Patent: *Nov. 18, 2008

(54) BRIDGING DEVICE

(76) Inventors: Kevin John Fullerton, 4/61 Waterloo Esplanade, Wynnum, Queensland (AU) QLD 4011; Theodor Reinhardt Schacht, 9 Gordon Street, Hendra, Queensland (AU) QLD 4011

( * ) Notice: Subject to any disclaimer, the term of this patent is extended or adjusted under 35 U.S.C. 154(b) by 34 days.

This patent is subject to a terminal disclaimer.

(21) Appl. No.: 11/568,868

(22) PCT Filed: May 9, 2005

(86) PCT No.: PCT/AU2005/000652

§ 371 (c)(1),
(2), (4) Date: Nov. 9, 2006

(87) PCT Pub. No.: WO2005/108161

PCT Pub. Date: Nov. 17, 2005

(65) Prior Publication Data
US 2008/0028546 A1    Feb. 7, 2008

(30) Foreign Application Priority Data
May 10, 2004    (AU) .............................. 2004902470

(51) Int. Cl.
*E01D 15/22*    (2006.01)
*E01D 15/10*    (2006.01)

(52) U.S. Cl. .................... 14/69.5; 14/71.1; 14/71.5; 14/72.5

(58) Field of Classification Search ................ 14/71.1, 14/71.5, 69.5, 72.5; 414/537, 921; 296/61; 119/847, 849; D34/32
See application file for complete search history.

(56) References Cited

U.S. PATENT DOCUMENTS

| | | | | | |
|---|---|---|---|---|---|
| 4,081,091 | A | * | 3/1978 | Thorley ....................... | 414/545 |
| 4,527,941 | A | * | 7/1985 | Archer ....................... | 414/537 |
| 4,581,784 | A | * | 4/1986 | Rousseau et al. ............ | 14/71.1 |
| 4,845,792 | A | * | 7/1989 | Bakula et al. ................ | 14/69.5 |
| 4,864,673 | A | * | 9/1989 | Adaway et al. .............. | 14/71.1 |
| 5,085,555 | A | * | 2/1992 | Vartanian .................... | 414/537 |
| 5,201,377 | A | * | 4/1993 | Wilson ....................... | 180/6.5 |
| 5,244,335 | A | * | 9/1993 | Johns ......................... | 414/537 |
| 5,312,149 | A | * | 5/1994 | Boone ........................ | 296/61 |
| 5,467,855 | A | * | 11/1995 | Sorensen ..................... | 193/5 |
| 5,538,307 | A | * | 7/1996 | Otis ........................... | 296/61 |
| 5,540,474 | A | * | 7/1996 | Holland ...................... | 296/61 |
| 5,636,399 | A | * | 6/1997 | Tremblay et al. ............ | 14/71.1 |

(Continued)

FOREIGN PATENT DOCUMENTS

| | | | |
|---|---|---|---|
| WO | 00/20252 | A1 | 4/2000 |
| WO | 02/02043 | A1 | 1/2002 |
| WO | 02/055334 | A1 | 7/2002 |

*Primary Examiner*—Thomas B Will
*Assistant Examiner*—Alina Schiller
(74) *Attorney, Agent, or Firm*—David A. Guerra

(57) ABSTRACT

A bridging device (10) for providing a bridging surface (12) between two points comprising a stack of interjoined beams (14) housed in a retracted position in a housing (11) mounted at a first point; and a drive system that drives the beams (14) to slide one over the other to telescopically extend out of the housing (11) from the retracted position to an extended position to thereby form a bridging surface (12) to a second point.

18 Claims, 8 Drawing Sheets

U.S. PATENT DOCUMENTS

| | | | |
|---|---|---|---|
| 5,803,523 A * | 9/1998 | Clark et al. | 296/26.1 |
| 5,813,071 A * | 9/1998 | Breslin et al. | 14/71.1 |
| 5,832,555 A * | 11/1998 | Saucier et al. | 14/71.1 |
| D434,542 S * | 11/2000 | Wickstead | D34/32 |
| 6,345,950 B1 * | 2/2002 | Gerwitz | 414/537 |
| 6,481,037 B1 * | 11/2002 | Fullerton et al. | 14/71.1 |
| 6,484,344 B1 * | 11/2002 | Cooper | 14/71.1 |
| 6,739,824 B2 * | 5/2004 | Dupuy et al. | 414/546 |
| 6,913,305 B1 * | 7/2005 | Kern et al. | 296/51 |
| 6,964,445 B1 * | 11/2005 | Bellis, Jr. | 296/57.1 |
| 7,316,043 B2 * | 1/2008 | Henblad et al. | 14/69.5 |
| 2004/0160079 A1 * | 8/2004 | Harper et al. | 296/61 |

* cited by examiner

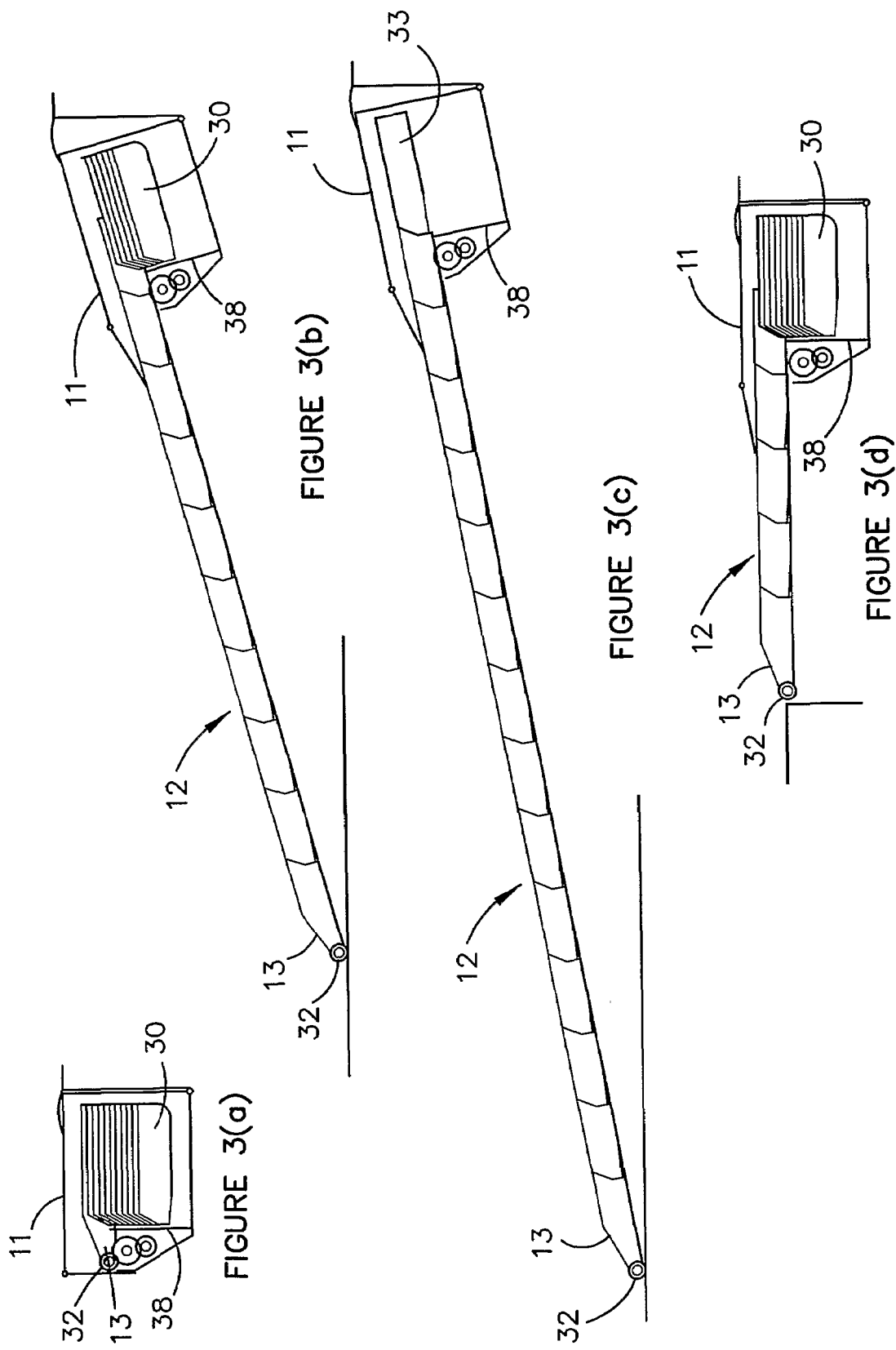

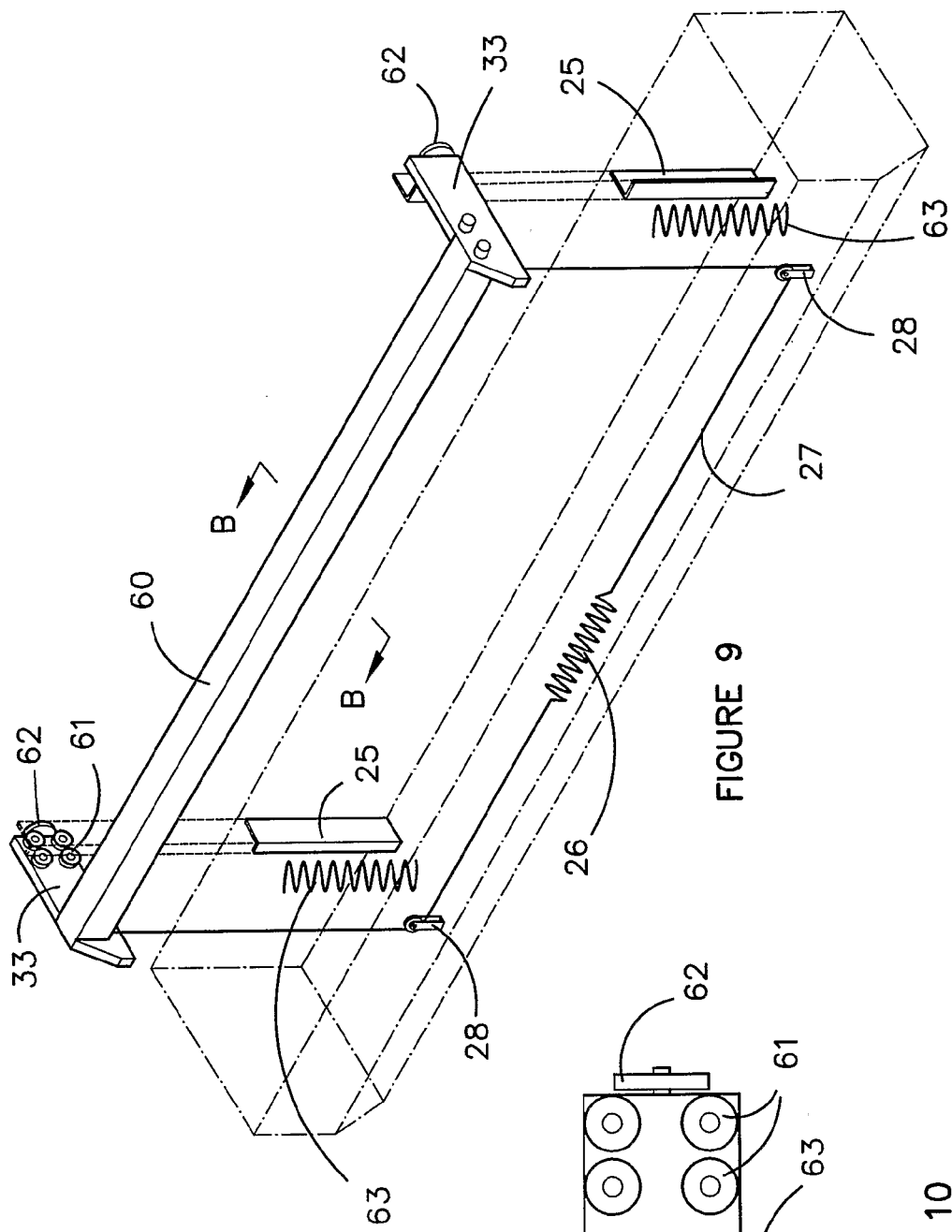
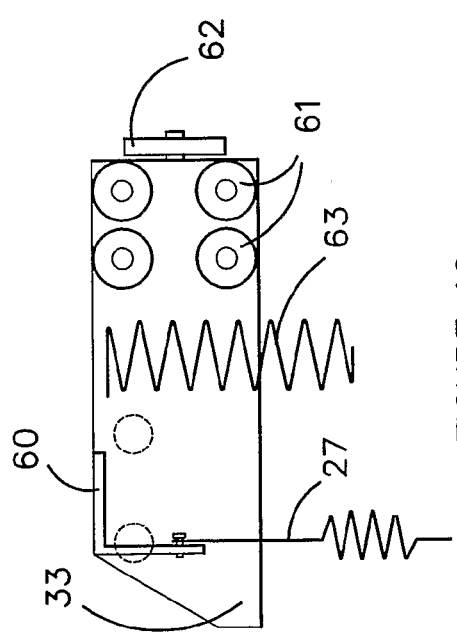

BRIDGING DEVICE

CROSS-REFERENCE TO RELATED APPLICATIONS

This application is an U.S. national phase application under 35 U.S.C. §371 based upon co-pending International Application No. PCT/AU2005/000652 filed on May 9, 2005. Additionally, this U.S. national phase application claims the benefit of priority of co-pending International Application No. PCT/AU2005/000652 filed on May 9, 2005 and Australia Application No. 2004902470 filed on May 10, 2004. The entire disclosures of the prior applications are incorporated herein by reference. The international application was published on Nov. 17, 2005 under Publication No. WO 2005/108161.

BACKGROUND OF THE INVENTION

Automated access ramps and other bridging devices bridge gaps and provide a pathway for persons or vehicles to cross.

Automatic ramps are very useful in the public and private transport industry. The ramps allow access onto and off trains and road vehicles for both enabled and disabled commuters as well as small vehicles such as bicycles and factor handling vehicles.

Known automatic ramps have several inherent problems. Firstly, in their retracted state they are bulky and require a large area to mount. Some of them-are also heavy which is undesirable in terms of speed and fuel efficiency if the retractable ramp is mounted on a transport vehicle. The aerodynamics and weight balance of vehicles can be affected by mounting a ramp structure to the vehicle. Most automated access ramps, due to their size, are economically unviable for retrofitting to existing transport systems. Retrofitting is made more difficult by the various structural constraints associated with mounting the ramps. Additionally, most devices need to be fully extended to perform the function of a ramp and can be unwieldy if the gap to be bridged is small.

WO 99/52738 describes an articulated ramp which is an earlier ramp by the inventors of the present invention. The ramp assembly described therein comprises a plurality of articulated segments forming a ramp body that extends from a retracted position located below the surface of the vehicle to an extended position where it bridges a gap between the vehicle and a second surface. The housing for the ramp body locates under the vehicle and houses the length of the ramp body in a substantially vertical position. Accordingly, the ramp body must be capable of significant curving through approximately 90° to achieve its final extended position. This articulated ramp assembly is awkward and very bulky, particularly when it is attached below the carriage floor of a train where space below the floor is limited and the aerodynamics and weight balance of the train could be affected by such a structure mounted to the carriages.

Furthermore, the articulated segments forming the ramp body of WO 99/52738 move in a scissor and clamping motion which present safety problems to the operator and the public. This scissor and clamping motion easily runs the risk of rendering the function of the ramp inoperable by the invasion of foreign objects, by accident or sabotage. This could result in disruption to transport schedules and possible physical injury.

The present bridging device addresses these drawbacks and the drawbacks with other known bridging devices.

SUMMARY OF THE INVENTION

In one aspect of the invention there is a bridging device that provides a bridging surface between two points and comprises:

a stack of interjoined beams housed in a retracted position in a housing mounted at a first point; and a drive system that drives the beams to slide one over the other to telescopically extend out of the housing from the retracted position to an extended position thereby forming a bridging surface to a second point.

Preferably, the beams are of a flat, slat-like form and are supported by end plates located at each end. The beams may have a forward edge that is downturned at an angle. The end plates are each stacked adjacent each other and slidingly engage the end plates on each adjacent side to enable telescopic movement of the bridging device.

The sliding engagement of the end plates is preferably effected by a sliding boss and key slot engagement which limits the extent that adjacent end plates may slide relative to one another. The underside of each end plate is preferably provided with a gear rack that meshes with a drive gear on a drive shaft that is driven by a drive source in the drive system.

Preferably, each end plate meshes with a drive gear dedicated to that end plate. The drive gears corresponding to each end plate are co-axially mounted on the drive shaft and clustered towards both ends of the drive shaft.

The drive shaft is preferably bearing mounted on the housing and is driven by a motor in the drive system, which is also mounted in the housing.

The first plate, which is the leading plate when the stack of beams is extended, is preferably provided with a wheel to allow the leading end of the bridging surface to move with the extending bridge when the leading end contacts the ground.

Each end plate preferably has a lock to lock adjacent plates in the extended position and prevent unintentional retraction.

In one embodiment the lock is a pivoting lever pinned in a recess on the end plate and adjacent the key slot on the same end plate, through which a boss on an adjacent plate protrudes. The lever pivots to protrude into the key slot and obstruct the boss from sliding out of the extended position.

The pivoting lever preferably has two tabs. The corresponding drive gear contacts the first tab as the bridging device is extending thereby moving the lock into a locked position. The drive gear contacts the second tab when moving to retract the bridging device thereby moving the lock into an unlocked position and allowing the end plates to retract back into the housing.

The key slot is preferably angled at a rear end to create a curve to the end plates when extended, therefore giving the bridging device in its extended position a pre-camber for visual appeal and psychological reassurance of its strength.

The housing is preferably an enclosed elongated structure having a front opening through which the beams extend. The opening may be provided with a tilting sprung cover. The sides of the opening may be provided with side shutters to cover the partially exposed opening. When in the extended position the beam located at the opening does not extend across the entire width of the opening.

The housing may be provided with base-mounted springs under the stack of beams to give an upward force to assist the incremental rise of the stack during extension.

The housing may further be provided with an end pull for stabilising the last plates supporting the last beam in the stack, which remains stationary inside the housing. When in the extended position the last plates inherently tend to tilt upwards. Accordingly, the end pull pulls the leading edge of the last plates downwards.

The end pull preferably comprises a tension spring located horizontally between the last pair of end plates and a tether attached to each end of the spring which extends in opposite directions, and turned through 90° around guide rollers to extend upwards and attach to, or close to, the respective last end plates.

The stack of beams is preferably restrained at the front of the housing in cassette form, only allowing the top beam to progress over catches on top of the restrainer as the stack of beams rises incrementally. The catches are biased by suitable biasing means such as sprung balls or a single leaf spring.

The interjoined beams may be of different lengths so as to create a trapezium shaped surface, or other shaped surface. The beams are preferably supported on top of the end plates but they may be supported underneath the end plates such that the end plates protrude upwards and form a border along the sides of the bridging surface.

The housing may be mounted in a tilting position to vary the angle at which the bridging surface extends. The tilting angle may be automatically or manually controlled to vary. A sensor may be provided to sense the required angle of tilt so that the angle may be adjusted accordingly.

BRIEF DESCRIPTION OF THE DRAWINGS

The present invention is described further by way of example with reference to the accompanying drawings by which:

FIGS. 3(a), 3(b) and 3(c) illustrate the bridging device in a retracted position, a partially extended position and a fully extended position respectively bridging a gap between points of different heights;

FIG. 3(d) illustrates the bridging device partially extended between points of the same height;

FIG. 9 is a perspective illustration of the last plates located in the bridging device;

FIG. 10 is a side sectional view taken at section B-B of FIG. 9;

DETAILED DESCRIPTION OF PREFERRED EMBODIMENTS

The Figures illustrate a bridging device 10 that in its preferred use is adapted to be mounted at or under a door opening of a vehicle. Such a vehicle could be a train, tram, bus, taxi, water vehicles such as ferries, or private road vehicles.

Figure 1A:
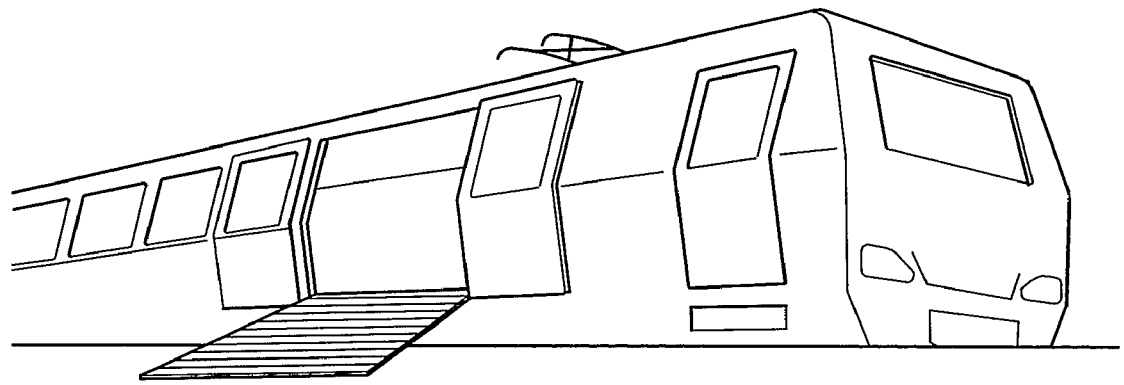
FIGS. 1(a), 1(b) and 1(c) illustrate applications of a bridging device according to the present invention.
Figure 1B:
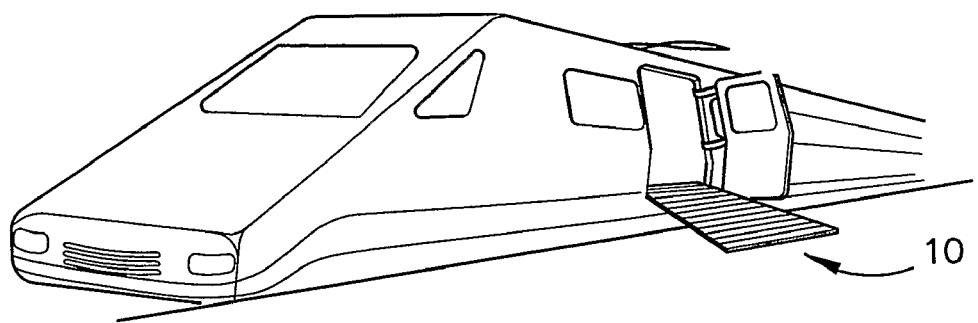
Figure 1C:
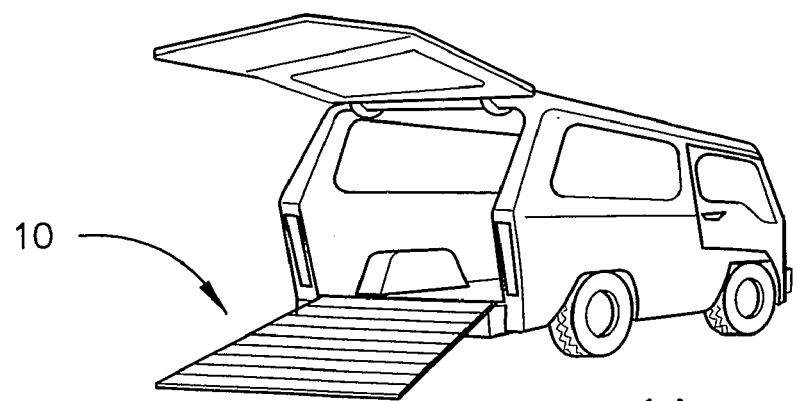
Figure 2:
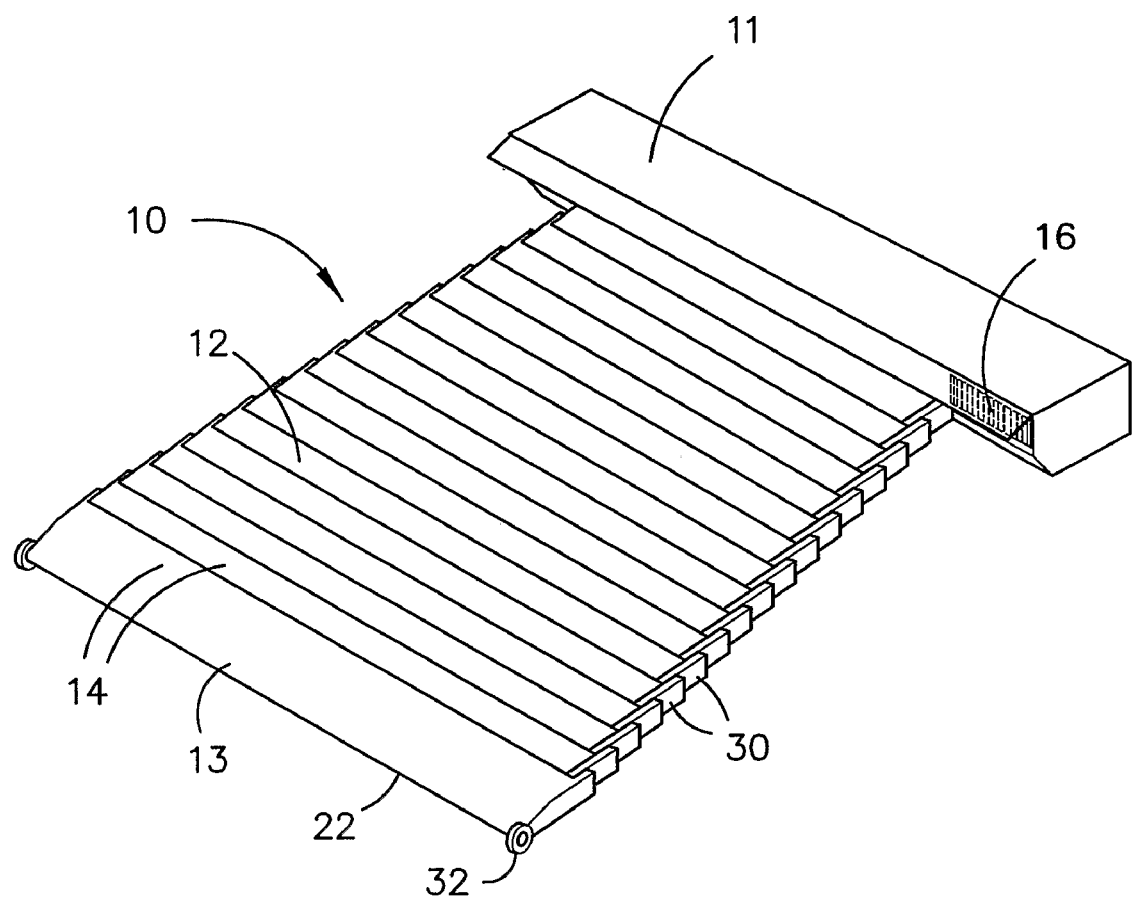
FIG. 2 is a perspective view of a bridging device according to the present invention in an extended position.

The bridging device 10 comprises a housing 11 from which, as illustrated in FIG. 2, a bridging surface, or ramp 12, telescopically extends. The ramp 12 is designed to bridge a gap between two points and specifically between the point at which the housing 11 is mounted and a point at the opposite side of the gap. Furthermore, the gap may be between: two spaced surfaces at the same level or surfaces of uneven height. A leading edge 13 of the ramp may be supported on the opposite surface or may remain unsupported, extending in a cantilevered fashion from the housing.

Figure 6:
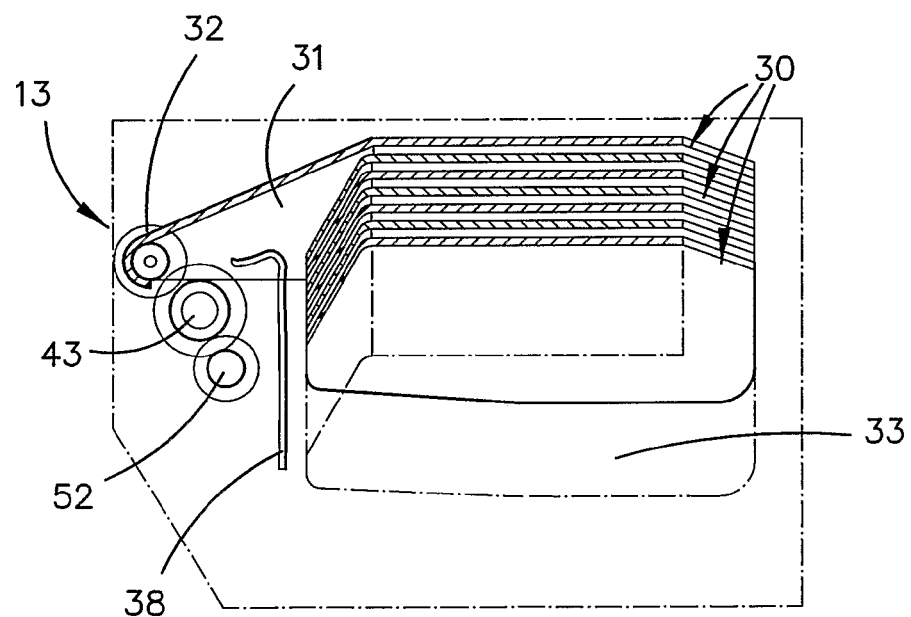
FIG. 6 is a side view of FIG. 5 viewed from the section A-A.

The ramp 12 comprises a stack of interjoined beams 14 that slide out of the housing one over the other to telescopically extend from the retracted position, as illustrated in FIGS. 3(a) and 6, through the partial extension of FIG. 3(b) and to a fully extended position as illustrated in FIG. 3(c) where the leading edge 13 is supported on the lower surface on the opposite side of a gap. The extended ramp is stable and capable of holding sufficient loads and withstand the normal loads associated with a crowd of people including wheelchairs, exiting public transport, or the weight of a vehicle traversing a gap.

FIG. 3(d) illustrates an alternative situation where the bridging device extends to bridge a small gap between level surfaces. Here the ramp only needs to extend part-way to close the gap without the leading edge of the ramp having to rest on the opposite surface. This can be achieved because the ramp 12 of the bridging device can extend as a cantilever and remain in an extended position entirely unsupported at its leading edge. This is achieved as a result of the structure of interjoining beams which provide strength to the ramp when partially or fully extended. Accordingly, the bridging device 10 can be used as a ramp between uneven surfaces where the leading edge rests on the opposite surface, or used as a bridge between surfaces, typically even surfaces, where the leading edge is not supported but is aligned level with the opposite surface as illustrated in FIG. 3(d).

The interjoined beams 14 are made of a strong, stiff material and overlap one another to prevent buckling of the ramp under high loads.

Housing 11 is a rectangular box structure that houses all the main components of the bridging device and is significantly smaller than the housing structures of known bridging devices.

Figure 4A:
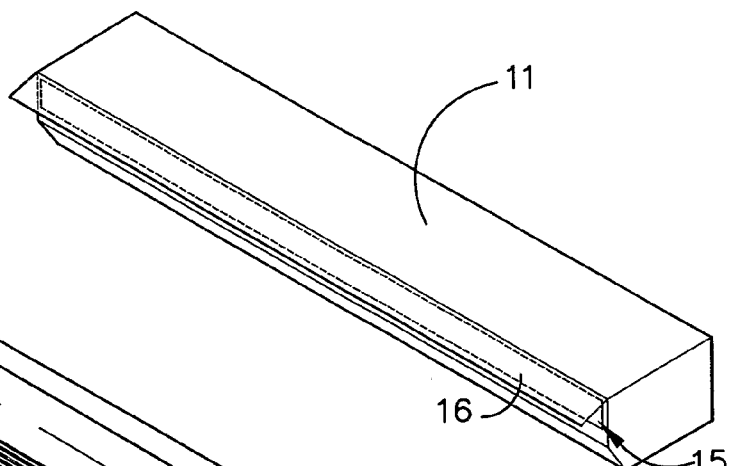
FIG. 4(a) is a perspective view of the bridging device in a retracted position.

Housing 11 is all enclosed, as illustrated in FIG. 4(a), but for an opening 15 on its front face through which the ramp extends. When in the retracted position the opening is closed by hinged cover 16.

Figure 4B:
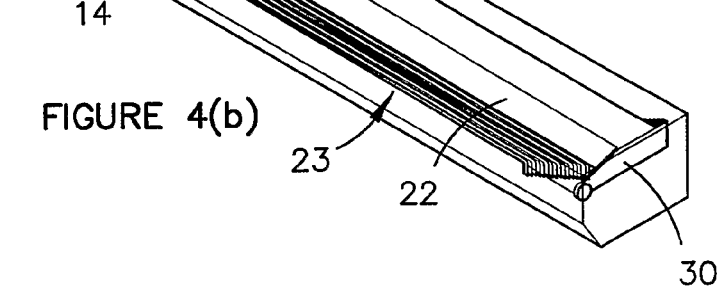
FIG. 4(b) is a view similar to FIG. 4(a) but shows the retracted beams located inside the housing.

FIG. 4(b) illustrates the stacked beams 14 in a retracted position inside the housing 11.

Figure 4C:
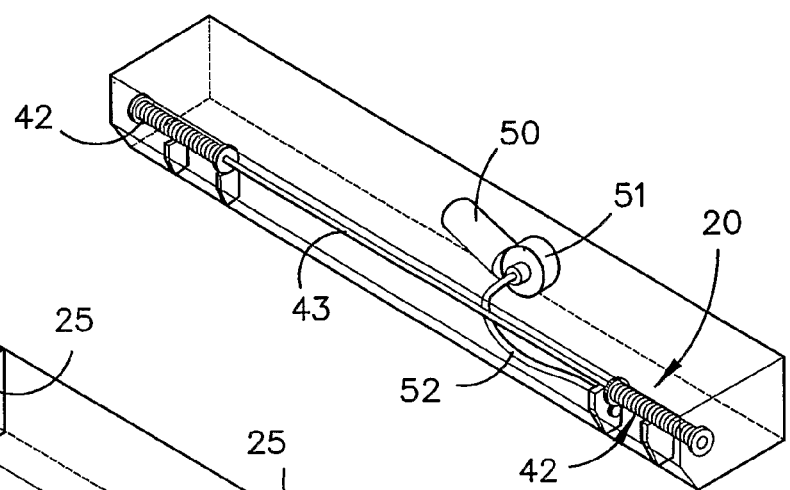
FIG. 4(c) is a view similar to FIG. 4(a) but illustrates the driving mechanism located inside the housing.

FIG. 4(c) illustrates the driving mechanism 20 used to drive the beams to automatically extend into a ramp.

Figure 4D:
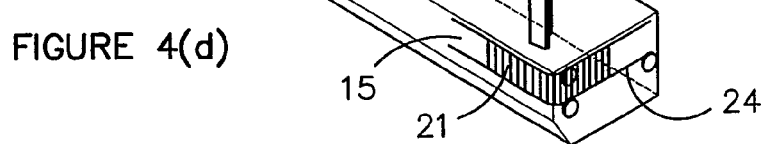
FIG. 4(d) is a view similar to FIG. 4(a) but illustrates various other components located inside the housing.

FIG. 4(d) illustrates sliding shutters 21 which serve to close the exposed portion of opening 15 when the extended ramp does not entirely fill the opening 15. FIG. 2, for example, illustrates the ramp in the extended position. Owing to the telescopic nature of the bridging device, the first beam 22 at the leading edge 13 is longer than the last beam 23, with all the beams in-between graduated in length from the first beam 22 to the last beam 23. Consequently there remains a gap in the opening 15 through which particles and objects could enter and damage the device 10. Accordingly, the sliding shutters 21 slide in guides 24 from the side of the housing to the front to close off the opening. The shutters may be driven from the main gear drive via cables and pulleys, thereby synchronizing the shutters' movement with that of the beams. Alternatively, the shutters may be spring loaded to shut as the ramp 12 extends.

FIG. 4(d) also illustrates vertical track brackets 25 mounted in the housing 11 that restrain the last beam 23 in the stack stationary inside the housing and form a vertical track inside the housing allowing vertical movement only.

The ramp 12 comprises beams, of a flat slat-like construction, overlapping one another. Each beam 14 is supported at both ends by an elongated end plate 30. In the preferred embodiment the beam is supported perpendicularly to the end plate and on top of the end plate. In the retracted position when all the beams 14 are stacked one on top of the other, the end plates are stacked one adjacent to the other. This arrangement is illustrated in FIGS. 5 and 6.

Each end plate slidingly engages the end plates on each adjacent side thereby enabling telescopic movement of the bridging device 10. The leading pair of end plates 31 at the leading edge 13 of the ramp and the last pair of end plates 33 in the housing 11 obviously only engage one other end plate. Additionally, the last pair of end plates 33 are fixed to the housing by way of brackets 25.

Figure 5:
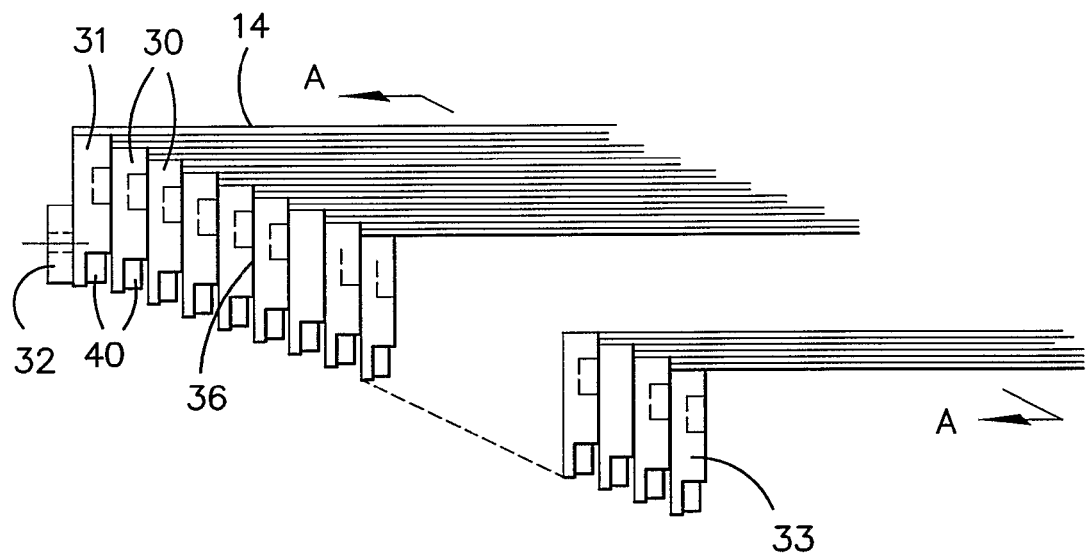
FIG. 5 is a part front view of one end of the extendable beams of the bridging device.

To make it possible for the beams to extend out onto a continuous level surface, the beams are graduated in length so as to accommodate the end plates 30 (see FIG. 5, for example). Hence, the leading edge 13 end of the ramp is wider than the housing end in this embodiment.

The leading pair of plates 31 at the leading end of the ramp are provided with a wheel 32. The wheel 32 is the first point of contact on a surface as the ramp extends to the surface. It enables the ramp to smoothly move along the surface as it extends.

The bridging device 10 may be designed to only extend partway if it is not necessary to execute a full extension or if an obstruction is encountered. In this case sensors are used to prevent contact between the leading end of the ramp and an obstruction.

Figure 7A:
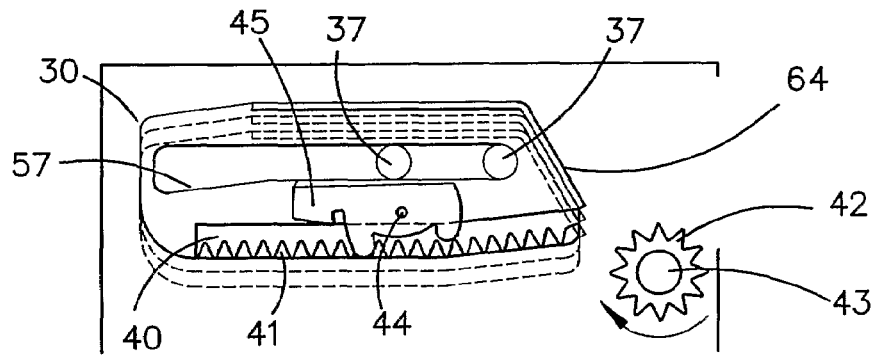
FIGS. 7(a), 7(b) and 7(c) illustrate in three sequential steps the mechanics and movement of an end plate as it is driven into the extended position.
Figure 7B:
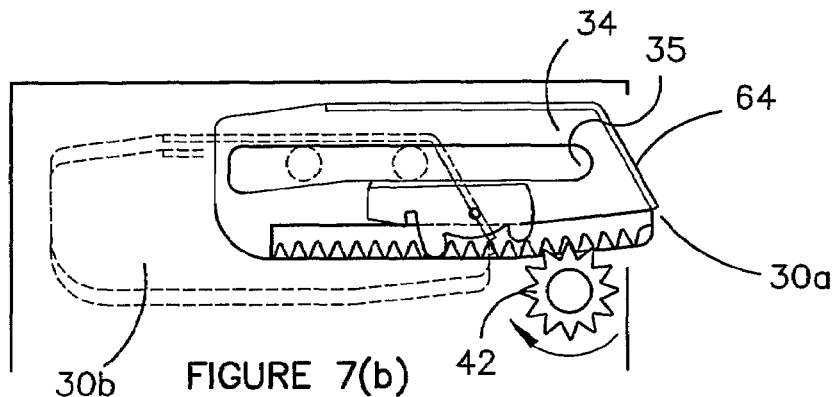
Figure 7C:
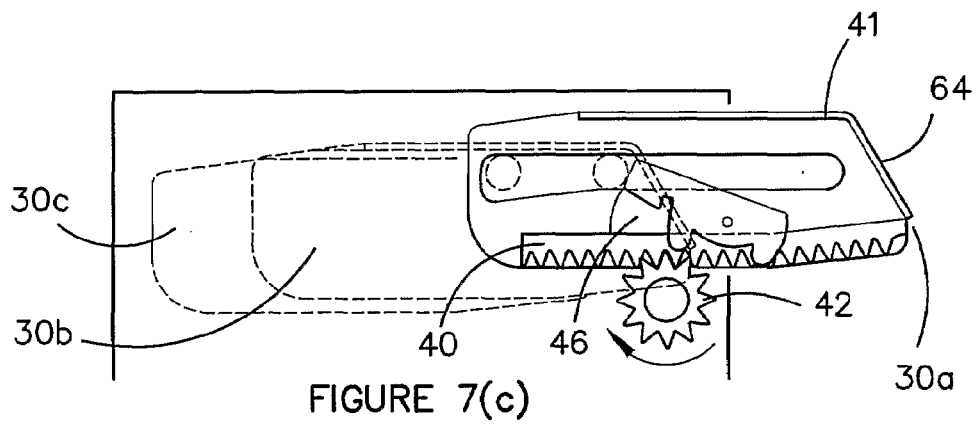
Figure 8:
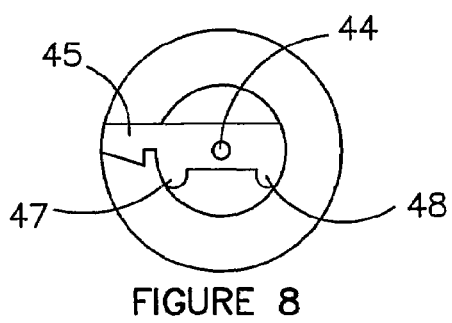
FIG. 8 illustrates one embodiment of a lock of the bridging device.

FIGS. 7(a) to 7(c) illustrate the mechanics of the end plates 30 that enable each end plate to slide against an adjacent end plate to provide the telescopic extension of the ramp.

Adjacent end plates slidingly engage by a slide boss and slot engagement. The inner face 34 of each end plate 30 has a slot 35. The outer face 36 of each end plate is provided with two bosses 37, or alternatively a single, elongated boss, which engage the slot 35 of an adjacent end plate. The slot has closed ends thereby preventing the bosses from escaping and adjacent plates from detaching. The spacing between the bosses is such that in the extreme positions in the slot 35 the beams 14 supported by the end plates are either stacked one above the other or extended still with some overlap without gaps therebetween.

In another embodiment the tolerance between the key slot and boss may be increased. This results in an extended ramp that drops slightly under gravity, which is useful where the first surface to which the bridging device is mounted is higher than the second surface across a gap. In effect the ramp 'seeks' the opposite second surface as it extends downward.

The beams 14 themselves may have a downturned edge 64 at the front edge, which provides additional strength for lighter weight, larger spans and stiffer construction. This is best seen in FIGS. 7(a), 7(b) and 7(c). The downturned edge 64 on each beam is angled forward to allow the beams to be stacked substantially vertically. In the extended position the downturned edge 64 of a beam is located underneath the rear edge of the beam in front. Therefore, each beam rests on the beam behind it as shown in FIG. 7(c), which increases the strength of the ramp.

A gear rack 40 is located in a recess 41 along the bottom edge of each plate and is flush with the inner face 34 of the plate. The gear rack 40 meshes with a drive gear 42 axially mounted on a drive shaft 43. The gear rack 40 bends upwards at the leading end to allow smooth meshing of the different level racks onto the gears thereby catering for the lead in between each plate due to the difference in stack height. A predetermined rise allows sufficient clearance for adjacent plate racks to mesh with the gears. This rise is preferably about 4 mm.

Drive shaft 43 is mounted in the housing on bearings and is driven by driving mechanism 20 that, as illustrated in FIG. 4(c), essentially comprises a motor 50, gear box 51 and a flexible or solid drive shaft 52 that drives drive shaft 43. All the components of the drive mechanism are mounted in the housing in the configuration of this particular embodiment.

Each gear rack 40 on each plate engages only with its own corresponding drive gear 42 such that each plate has its own gearing system. Accordingly, and as illustrated in FIG. 4(c), the drive shaft 43 supports a number of co-axially mounted drive gears 42 that each correspond to an end plate 30. In this configuration the drive gears 42 are clustered at each end of the drive shaft 43 and operate in pairs to correspond with each pair of end plates 30 mounted to every beam 14. Accordingly, each drive gear 42 on one side of the drive shaft 43 has a corresponding pair located at the other end of the drive shaft.

By virtue of the end plates 30 at each end, the beams 14 sequentially slide over each other to telescopically extend into a ramp. In this embodiment extension begins with the top most beam, which is the first and forward most beam. In the first instance the drive shaft 43 aligns the first pair of drive gears, located at the extreme far ends of the drive shaft 43, with the leading pair of end plates 31 supporting the first beam 22 to extend out of the housing.

Turning back to FIGS. 7(a) to 7(c) the drive shaft 43 rotates drive gear 42 to engage rack 40 of a first pair of end plates 30a and to drive the end plates, and consequentially the beam 14, in a forward direction. FIG. 7(b) illustrates gear 42 moving end plate 30a in a forward direction to reach the position illustrated in FIG. 7(c). As gear 42 passes the point illustrated in FIG. 7(c), bosses 37 of a second plate 30b (illustrated in ghost lines) located in the slot 35 of the first plate 30a do not allow the first plate 30a to travel any further without pulling the second plate 30b along with it.

The leading end plates 31 are longer than the remaining end plates so that the gear racks on the leading plates can remain engaged with the drive gears while the ramp is in the retracted position. FIG. 6 best illustrates this.

At this point the driving force is transferred from the gear rack 40 of the first plate 30a to the adjacent drive gear associated with the second end plate 30b. The second drive gear corresponding to the second end plate 30b is not illustrated in FIGS. 7(a) to 7(c) but would be located in front of the first drive gear 42 as viewed in those Figures.

The second drive gear would then rotationally engage with the second end plates gear rack (not shown) to drive the second plate 30b forward until the bosses 37 in the third end plate 30c (illustrated in ghost lines) engage with the rear end of the slot of the second end plate.

The driving process thus continues by sequentially transferring the driving force from one drive gear 42 to the next.

The driving mechanism 20 stops when the drive shaft has moved forward the second last end plate. The last end plate is fixed and remains stationery.

To ensure each end plate remains in a forward position relative to the end plate immediately behind it, each end plate is provided with a lock.

FIGS. 7(a), 7(b), 7(c) and 8 illustrate one embodiment of lock in which the lock is a lever plate 45 pivotingly mounted on inner face 34 with pin 44. Lever 45 is pinned to the inner face 34 of each end plate 30 in a corresponding recess 46. Specifically, the lever 45 is positioned on inner face 34 between slot 35 and gear rack 40 so that pivoting movement of the lever causes it to protrude into slot 35 and interfere with rack 40.

FIGS. 7(a) and 7(b) illustrate the lever 45 in an unlocked orientation. FIG. 7(c) illustrates the lever 45 rotated in a clockwise direction to protrude into slot 35 to thereby confine bosses 37 towards the rear of slot 35 and lock the adjacent plates in an extended position.

Lever 45 is pivoted into the locked position by drive gear 42 rotating along gear rack 40. Lever 45 has two tabs extending downwardly adjacent gear rack 40. These are: lock tab 47 and unlock tab 48.

As drive gear 42 rotates in the direction extending the ramp, the drive gear passes under unlock tab 48, which is shorter than lock tab 47, and contacts lock tab 47. This contact occurs when the slot 35 of the first end plate 30a has moved forward such that bosses 37 of the second end plate 30b reach the rear of slots 35. This is illustrated in FIG. 7(c). At this point the contact between the drive gear 42 and lever 45 pivots the lever in a clockwise direction to protrude into slot 35 and prevent bosses 37 moving from the rear of slot 35.

As the drive shaft and drive gears systematically move from one pair of plates to the next, each end plate is locked against the end plate behind it. The result is an extended ramp that can be securely and stably used without the concern that the plates could slide back over each other and the ramp collapse.

When retracting the beams 14 the drive shaft rotates in the opposite direction to systematically retract each beam one by one beginning with driving the second last beam onto the last stationery end plate 33. In the retracting position the drive shaft and drive gears rotate anti-clockwise to travel from the position illustrated in FIG. 7(c) to the position illustrated in FIG. 7(b) then FIG. 7(a). With the lever 45 still in the locked position gear 42 travels under lock tab 47 and rotates to make contact with unlock tab 48. When contact is made lever 45 pivots about pin 44 in an anti-clockwise direction to bring the lever out of the locking position and free bosses 37 to move towards the front of slot 35 as the end plate 30 is pulled back by the driving mechanism 20. Hence, each pair of plates is one by one retracted back into the housing until the plates adopt the retracted stack position illustrated in FIGS. 5 and 6.

Other embodiments of plate locks may also be used. For example instead of a lever a spring biased pin may be seated in a stepped aperture extending through each end plate. When extension occurs the pin could be forced to extend to behind the plate adjacent to it and prevent the plate from retracting.

The rear of each slot can be bent or curved to induce a pre-camber causing the extended ramp 12 to curve slightly and form a hump giving the structure a sense of stability. In the case of its application as a pedestrian walk way, pedestrians are more likely to view the bridging device 10 as a safe and stable ramp to traverse if the ramp has a slight outward curvature compared with a "sagging" inward curving ramp.

If the bridging device 10 is intended to bridge a gap between two points having relative uneven heights the curve of the extending ramp can be adjusted such that, for example, the telescopically extending ramp extends horizontally from the housing and curves to meet a surface that is lower than the height of the housing. This adjustment can be made by enlarging the bottom rear of slot 35 to form a trajectory curve angle 57. The severity of the trajectory curve angle 57 may be varied to achieve the desired curvature through which the bridging device 10 telescopically extends.

Alternatively or in combination, the angle of extension can be varied by tilting the entire housing itself relative to its mounting point. This allows the ramp to automatically find the correct level of the landing surface. Should upward tilting be required for situations where the landing surface is higher, a separate driving mechanism can be incorporated. The bridging device may even be able to sense the necessary degree of tilt by using a sensor to detect the opposite surface and adjust the tilt accordingly.

Alternatively, the bridging device may be associated with a microprocessor which can be pre-programmed to tilt the housing according to a pre-programmed location. For example, a bridging device mounted on a train could be programmed to tilt at a specific angle as the train arrives at a particular station.

For example, if the bridging device 10 is mounted underneath the doorway entrance of a commuter train the tilt angle of the housing can adjust to the angle required to bridge the relative height of the platforms and train floor. This is useful for accommodating different platform heights commuters must negotiate when travelling by trains.

To prevent the plates from slipping out over each other under the effect of gravity or friction a stack restrainer 38 at the front of the housing applies pressure onto the stack so to catch against any slipping beams. The stack restrainer 38 is illustrated in FIGS. 3(a) to 3(c) and FIG. 6. The restrainer may be a member attached to the housing having a spring-biased ball, preferably stainless steel, located in a recess at the top of the member. As the stack rises incrementally the restrainer allows only the top beam in the cassette to depress the sprung ball and pass over.

Alternatively, FIG. 6 illustrates a restrainer 38 in the form of a member having an upper end shaped as a leaf spring which will depress to allow the top most beam to pass over and out of the opening.

The last beam 14 that remains stationery inside the housing is in the form of a more stable brace angle 60 as illustrated in FIG. 10. The end plates 30 on either side of the brace angle 60 are fixed to the housing by way of vertical track brackets 25.

Springs 63 are mounted under the last beam 14 to assist in the stack rising evenly in the cassette (see FIGS. 9 and 10).

In one embodiment of the bridging device there may be a need for assistance in keeping the stack of beams level during extension. In this case, an end pull is used to force the nose of the last plates 30 downwards. As shown in FIGS. 9 and 10 the end pull comprises a tension spring 26 located horizontally between the last pair of end plates 30. A tether 27 is attached to each end of the string and extends in opposite directions towards the end plates 30. Tethers 27 are turned through 90° by rollers 28 so as to extend upward towards their respective end plates 30. The ends of tethers 27 are connected to brace angle 60 close to the end plates 30 by means of a pin. This is illustrated in FIG. 10. The tension force of spring 26 pulls the tethers 27 in a downward direction to react against the tendency of the last pair of plates to pull upwards.

While an end pull is illustrated in FIGS. 9 and 10, it is understood that the components of the end pull (spring 26, tethers 27 and rollers 28) may be omitted from the bridging device where an end pull is not required.

The last end plates themselves are restrained horizontally in the housing and are provided with limited vertical movement for raising the stack of beams. Vertical restraint is effected by guide wheels 61 and slide guide wheels 62 which enable the last end plates 30 to slide on the vertical track brackets 25. Alternatively, other vertical sliding means, such as bearing tracks, may be used.

The bridging device may be usefully applied to a range of applications from small scale pedestrian ramps to larger scale bridges for vehicles where a temporary bridge is required.

Whilst in the extended position, in this embodiment the ramp inherently acquires a trapezoid shape (on account of the first beam being longer than the last beam). This shape may be exaggerated to give the ramp a flared trapezium shape, which may be desirable in certain applications.

Figure 11:
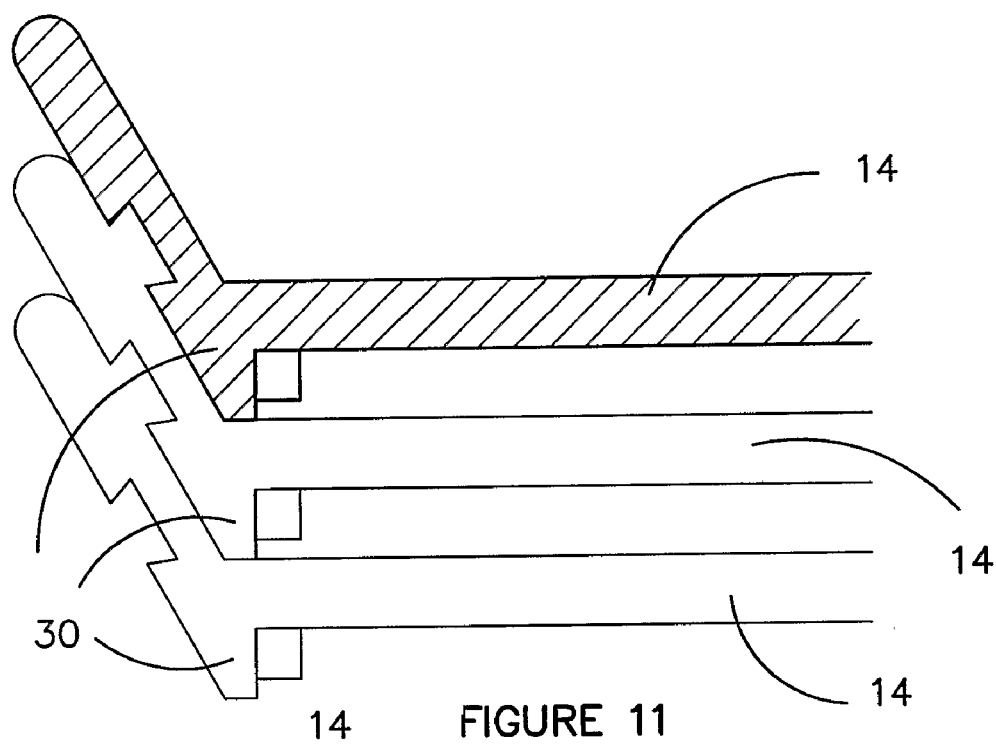
FIG. 11 is a front view of an end of a stack of beams according to another embodiment of the bridging device.

It is possible to construct the bridging device 10 to achieve a straight rectangular ramp with parallel sides. In this case the end plates would be angled inwards as illustrated in FIG. 11. The mechanics of each end plate would be different to that described above, for example bosses may be replaced with a dove tail key, but the working concept would remain the same.

Figure 12:
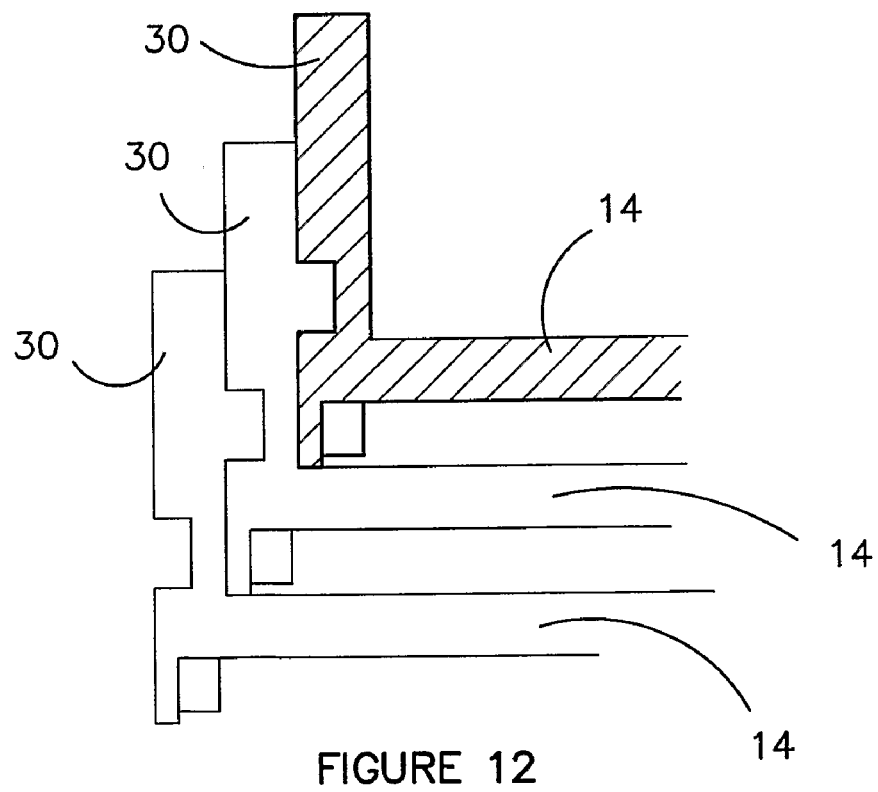
FIG. 12 is a front view of an end of the stack of beams in accordance with yet another embodiment of the bridging device.

In another embodiment illustrated in FIG. 12 rather than mounting the beams on top of the end plates as illustrated in the preferred embodiment, the beams may be upturned with the end plates projecting upwards. When the bridging device is in an extended position in this embodiment, it gives the ramp borders along the edges of the ramp and reduces the likelihood of wheel chairs, prams, and the like falling off the side of the ramp before reaching the end.

The bridging device may be made entirely of metal and foreseeably of high strength steel, or high strength aluminium or cast metal or the like. Alternatively, the device may involve composite materials made of carbon fibres or plastics. It is an advantage to choose high strength but lightweight materials to reduce the weight of the bridging device and overall vehicle load. When in the retracted position, the bridging device allows a large ramp to be stored in a small space, which is desirable.

It will be understood to persons skilled in the art of the invention that many modifications may be made without departing from the spirit and scope of the invention.

The invention claimed is:

1. A bridging device for providing a bridging surface between two points comprising:
    a housing mountable to a first point;
    at least two interjoined beams housed in a retracted position in said housing; and
    a drive system adapted to drive said beams to slide one over the other to telescopically extend out of said housing from the retracted position to an extended position to thereby form a bridging surface to a second point;
    wherein said beams are supported by end plates located at each end of said beam, said end plates being adapted to be stacked adjacent to each other and to slidingly engage said end plates on each adjacent side, and wherein said end plates slide relative to one another by way of a boss and key slot sliding engagement between adjacent end plates;
    wherein an underside of each end plate is provided with a gear rack that meshes with a drive gear on a drive shaft driven by a drive source in said drive system, and wherein each end plate meshes with its own dedicated drive gear coaxially mounted on said drive shaft.

2. The bridging device as set forth in claim 1, wherein said drive shaft is bearing mounted in said housing and is driven by a motor defining said drive source.

3. The bridging device as set forth in claim 1, wherein each end plate is provided with a lock to lock adjacent plates in the extended position, wherein said lock is a pivoting lever pinned in a recess on said end plate and adjacent a key slot on said same end plate, through which a boss on said adjacent end plate protrudes, whereby said lever pivots to protrude into said key slot and obstruct said boss from sliding along said key slot.

4. The bridging device as set forth in claim 3, wherein said pivoting lever is provided at least two tabs, whereby during extension of said bridging device said drive gear contacts a first tab to move said lock into a locked position, and during retraction of said bridging device said drive gear contacts a second tab to move said lock into an unlocked position thereby allowing said end plates and beams to retract back into said housing.

5. The bridging device as set forth in claim 3, wherein said key slot is angled at a rear end to create a curve such that when said end plates are in an extended position the bridging surface is cambered.

6. The bridging device as set forth in claim 1, wherein said beams are substantially flat and slat-like in shape so as to stack one on top of the other, and having a forward edge that is downturned at an angle, and wherein said end plates at a leading front beam are defined as first plates and are each provided with a wheel adapted to contact a surface at the second point.

7. The bridging device as set forth in claim 6, wherein said beams are made from a material selected from the group consisting of metal, composite materials, carbon fibers, and plastics.

8. The bridging device as set forth in claim 1, wherein said housing is an enclosed elongated structure defining a front opening through which said beams extend, said opening is provided with a tilting sprung cover.

9. The bridging device as set forth in claim 1 further comprising a biasing means mountable in said housing to provide an upward force on said beams for incrementally raising said beams during extension.

10. The bridging device as set forth in claim 9 further comprising a restraining catch at the front of said housing, said catch being adapted to permit only the top-most beam of said rising beams to extend through said housing during extension.

11. A bridging device comprising:
    a housing mountable to a first point, said housing being an enclosed elongated structure defining a front opening and including a biased tilting cover;
    a stack of interjoined beams housed in a retracted position in said housing, said beams being supported by end plates located at each end of said beams, said end plates being adapted to be stacked adjacent to each other and to slidingly engage said end plates on each adjacent side, wherein said end plates slide relative to one another by way of a boss and key slot sliding engagement between adjacent end plates;
    a lock provided with each of said end plates to lock adjacent plates in the extended position, each of said locks is a pivoting lever pinned in a recess on said end plate and adjacent a key slot on said same end plate, through which a boss on said adjacent end plate protrudes, whereby said lever pivots to protrude into said key slot and obstruct said boss from sliding along said key slot; and
    a drive system adapted to drive said beams to slide one over the other to telescopically extend out of said housing from the retracted position to an extended position to thereby form a bridging surface to a second point, said drive system having a motor;
    wherein said housing further comprising a biasing means mountable therein and a restraining catch located at the front of said housing, said biasing means being adapted to provide an upward force on said beams for incrementally raising said beams during extension, said restraining catch being adapted to permit only the top-most beam of said rising beams to extend through said housing during extension;

wherein an underside of each end plate is provided with a gear rack that meshes with a drive gear on a drive shaft driven by a drive source in said drive system, and wherein each end plate meshes with its own dedicated drive gear coaxially mounted on said drive shaft.

12. The bridging device as set forth in claim 11, wherein said interjoined beams are of different lengths so as to create a trapezium shaped bridging surface.

13. The bridging device as set forth in claim 11, wherein said interjoined beams are of the same length to create a rectangular bridging surface.

14. The bridging device as set forth in claim 11, wherein said housing is mounted so as to be capable of tilting relative to said first point, and wherein said housing further comprising a sensor that senses the required angle of tilt such that the tilt angle can be adjusted.

15. The bridging device as set forth in claim 11, wherein said housing further comprising an end pull for stabilizing the last end plates which remain inside said housing when said bridging device is fully extended.

16. The bridging device as set forth in claim 15, wherein said end pull pulls a leading edge of the last end plates downwards.

17. The bridging device as set forth in claim 16, wherein said end pull comprises a tension spring located horizontally between the last end plates, and a tether attached to each end of said tension spring which extends in opposite directions, turns through 90° around guide rollers and extends upwards to each attach to the last end plates.

18. A method of bridging two points comprising the steps of:

providing a bridging device comprising a housing mountable to a first point; at least two interjoined beams housed in a retracted position in said housing; and a drive system adapted to drive said beams to slide one over the other to telescopically extend out of said housing from the retracted position to an extended position to thereby form a bridging surface to a second point; wherein said beams are supported by end plates located at each end of said beam, said end plates being adapted to be stacked adjacent to each other and to slidingly engage said end plates on each adjacent side, and wherein said end plates slide relative to one another by way of a boss and key slot sliding engagement between adjacent end plates; wherein an underside of each end plate is provided with a gear rack that meshes with a drive gear on a drive shaft driven by a drive source in said drive system, and wherein each end plate meshes with its own dedicated drive gear coaxially mounted on said drive shaft;

mounting said bridging device at said first point; and driving said drive system of said bridging device to telescopically extend said beams out of said housing from a retracted position to an extended position to thereby form a bridging surface to a second point.

* * * * *